(12) United States Patent
Bonewitz et al.

(10) Patent No.: US 10,988,950 B2
(45) Date of Patent: Apr. 27, 2021

(54) HOUSING FOR PORTABLE TOILET

(71) Applicants: Andre Bonewitz, Friedewald (DE); Norbert Steigerwald, Schoellkrippen (DE)

(72) Inventors: Andre Bonewitz, Friedewald (DE); Norbert Steigerwald, Schoellkrippen (DE)

(73) Assignee: ADCO UMWELTDIENSTE HOLDING GMBH, Ratingen (DE)

( * ) Notice: Subject to any disclaimer, the term of this patent is extended or adjusted under 35 U.S.C. 154(b) by 33 days.

(21) Appl. No.: 16/003,542

(22) Filed: Jun. 8, 2018

(65) Prior Publication Data

US 2019/0376304 A1    Dec. 12, 2019

(51) Int. Cl.

| E04H 1/12 | (2006.01) |
|---|---|
| A47K 11/02 | (2006.01) |
| E04B 1/61 | (2006.01) |
| F24S 21/00 | (2018.01) |
| E03D 9/052 | (2006.01) |
| E03D 9/12 | (2006.01) |
| F21S 2/00 | (2016.01) |
| E03D 9/00 | (2006.01) |

(52) U.S. Cl.
CPC ............ *E04H 1/1216* (2013.01); *A47K 11/02* (2013.01); *E04B 1/61* (2013.01); *E04H 1/1266* (2013.01); *E03D 9/007* (2013.01); *E03D 9/052* (2013.01); *E03D 9/12* (2013.01); *E04B 2001/6195* (2013.01); *F21S 2/005* (2013.01); *F24S 21/00* (2018.05)

(58) Field of Classification Search
CPC ..... E04H 1/1216; E04H 1/1266; A47K 11/02; E04B 1/61; E03D 9/007
See application file for complete search history.

(56) References Cited

U.S. PATENT DOCUMENTS

| 5,647,074 A * | 7/1997 | White, Jr. ............... E03D 9/002 4/312 |
|---|---|---|
| 6,438,902 B1 * | 8/2002 | Muller .................. E04H 1/1216 4/460 |
| 8,172,588 B2 * | 5/2012 | Johnson ................... H02G 3/00 439/215 |
| 9,340,963 B2 * | 5/2016 | Ito ......................... E04H 1/1266 |
| 2006/0260214 A1 * | 11/2006 | Tagg ..................... E04H 1/1216 52/79.1 |
| 2006/0277675 A1 * | 12/2006 | Tinnell .................. E04H 1/1216 4/477 |
| 2007/0039260 A1 * | 2/2007 | Haddad ................ E04H 1/1216 52/241 |

\* cited by examiner

*Primary Examiner* — Janie M Loeppke
(74) *Attorney, Agent, or Firm* — Andrew Wilford

(57) ABSTRACT

A housing for a portable sanitary fixture having at least one floor part, at least one roof part, a plurality of side walls, and a plurality of support posts. The floor part is connected to the roof part and/or at least two side walls to each other via at least one support post. The housing has at least three, preferably at least four, and preferably four support posts of which at least one is hollow, and at least one electrically operated functional device or at least one part of at least one electrically operated functional unit is held in an interior of the support post.

13 Claims, 4 Drawing Sheets

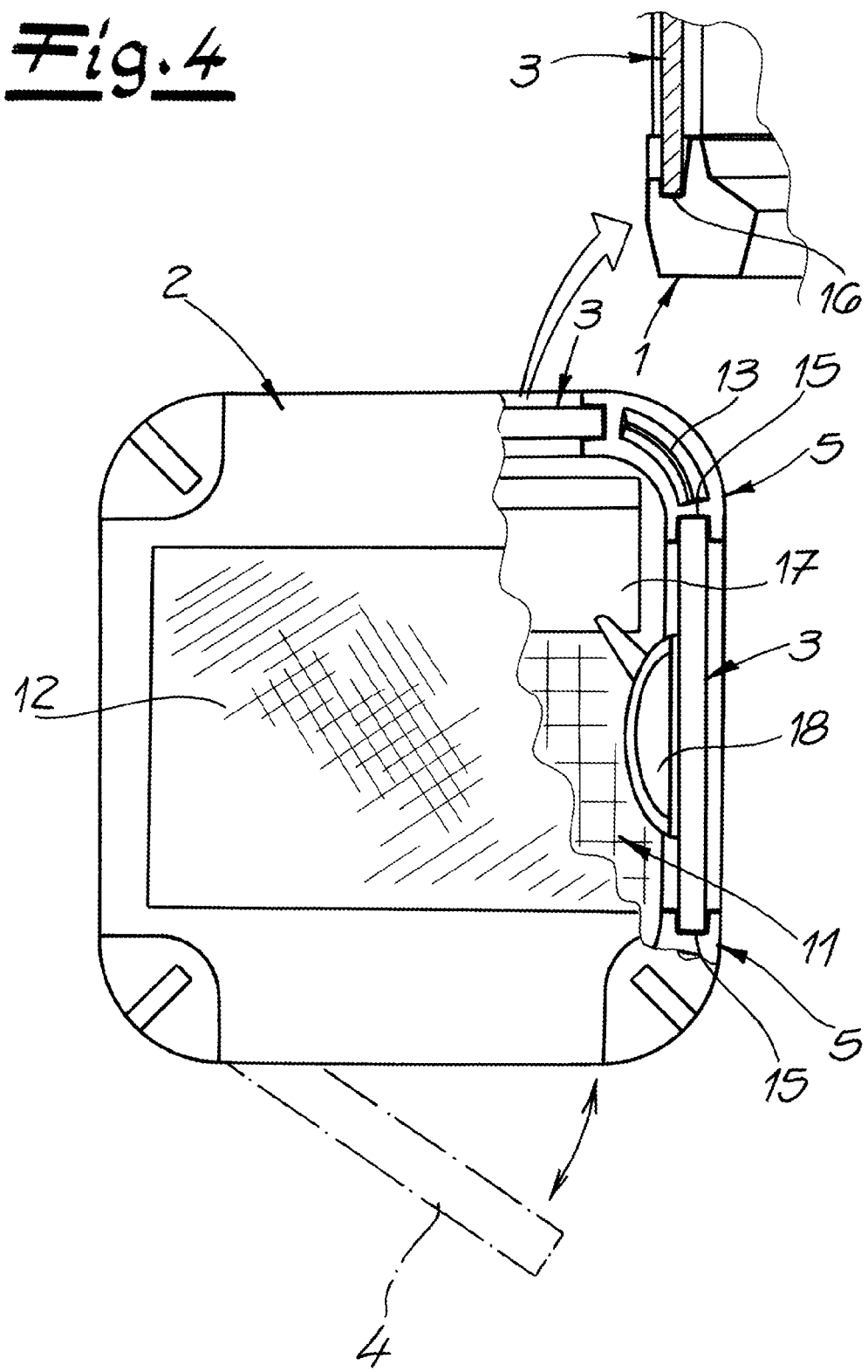

HOUSING FOR PORTABLE TOILET

The invention relates to a housing for a portable sanitary fixture, in particular a portable-toilet housing having at least one floor part, at least one roof part, a plurality of side walls, and a plurality of support posts and the floor part is connected to the roof part and/or at least two side walls to each other via at least one of the support posts. It is within the scope of the invention that this relates to a transportable housing for a portable sanitary fixture that can be transported on transport vehicles. This mobile housing and portable sanitary fixtures is normally set up for specific time periods, for example on construction sites or for events such as markets, exhibitions and the like. Afterwards, the mobile or transportable housing and portable sanitary fixtures must be transported away again.

A housing for a portable sanitary fixtures of the type described above is known in practice in different embodiments. In particular, because of the preferred transportable nature of such a housing for a portable sanitary fixture, it is desirable for it to be constructed to be as compact as possible. In terms of simple assembly, maintenance, repair and cleaning of the portable fixture housing, it is also desirable that there are as few separate, as the case may be removable parts as possible. In fact, the housing should be distinguished by a low number of parts that are free of edges and corners as much as possible so that simple assembly, maintenance and cleaning of the housing and above all also of the interior of the housing are possible. On the other hand, it is desirable for a housing for portable sanitary fixture to have electrical devices, such as an electrical illumination system and/or an electrical exhaust air discharge for example. To this end, in the case of housings known from practice, mountable parts are provided in or on the housing that are frequently not mounted until the housing is set up or are dismantled before the housing is transported away. This is relatively time consuming. Such devices or parts are also frequently the reason why the housings or the interior spaces of the housings are very difficult and time consuming to clean. There is a need for improvement in this respect.

Consequently, the object of the invention is to provide a portable sanitary-fixture housing of the type described above in which the above-described disadvantages are avoided easily and effectively.

To attain this object, the invention is a portable sanitary-fixture housing, in particular a portable-toilet housing, having at least one floor part, at least one roof part, a plurality of side walls, and a plurality of support posts, wherein the floor part is connected to the roof part and/or at least two side walls to each other via at least one of the support posts, and the housing has at least three, preferably at least four, and preferably four support posts, at least one of the support posts is hollow and at least one electrically operated functional device and/or at least one portion or at least one part of an electrically powered functional unit is provided inside the hollow support post. All parts or at least a majority of the parts of the electrically operated functional device are preferably accommodated inside the hollow support post, It is within the scope of the invention that at least one of the support posts of the portable sanitary-fixture housing according to the invention is a corner posts. According to one embodiment of the invention, all the support posts of the portable sanitary-fixture housing are corner posts. It is furthermore within the scope of the invention that the portable sanitary-fixture housing have four support or corner posts. Four support or corner posts are advantageously provided on four corners of the housing. It is recommended that a portable sanitary-fixture housing according to the invention have a roof part, a floor part and four support posts configured as corner posts, and the corner posts connect the roof part to the floor part.

A highly recommended embodiment of the invention is characterized in that at least one portion of the support posts or corner posts, preferably all support posts or corner posts of the housing are configured as one piece with respect to the longitudinal extension thereof and are configured especially preferably as one piece plastic parts. In this respect, the housing according to the invention, in accordance with an especially proven embodiment, has four one-piece plastic support or corner posts with respect to the longitudinal extension thereof.

The floor part of the housing is advantageously connected to the roof part via a plurality of the support or corner posts and preferably connected to each other via all the support or corner posts of the housing. Tongue-and-groove connections are preferably set up at a joint process between the floor part and a support or corner post and/or between the roof part and a support or corner post. According to a highly recommended embodiment, the posts have on each their ends thereof a tongue that engages in a complementary groove of the roof or floor part. The tongue-and-groove connecting elements forming a tongue-and-groove connection between the posts and the roof part or floor part each advantageously extend through holes aligned with each other so that the respective posts are connected to one another with the roof part or with the floor part via at least one connecting element passing through bores aligned with one another, for example via a connecting bolt or a connecting screw. A recommended embodiment of the invention is characterized in that four support or corner posts of the housing each have on both of their ends at least one tongue or a tongue and that the roof part and/or the floor part (each) have four grooves for an interaction with the associated four tongues of the posts. These holes and the connecting element respectively passing through the holes are advantageously provided on each tongue-and-groove connection between the posts and the roof part or the floor part. According to a preferred embodiment, a connecting screw forming a connecting element passes through the hole extending through the tongue and the groove, and preferably then, from the inside of the housing, at least one nut is wound onto the thread of the connecting screw to lock the tongue-and-groove connection.

It is recommended that a side wall of the housing according to the invention connect two support or corner posts to one other and that preferably tongue-and-groove connections are formed between the side wall and the two posts. To this end, it is recommended that the side wall have, on both of its edges facing the posts, at least one tongue that engages in a corresponding groove of the respective post. The at least one tongue extends in this case over at least the majority of the vertical length of the side wall. The associated groove likewise extends in the support/corner post over at least a majority of the vertical length of the post. It has been proven advantageous in the case of a preferred housing having four support posts/corner posts, with three of said posts, two posts are each connected to one another via a side wall, and it is recommended that a tongue-and-groove connection be formed between each the posts and the respective side wall and highly preferably that the tongue-and-groove connection described above be used. In the case of a four-sided housing, the fourth side carries a door between two support posts/corner posts, which door is advantageously pivoted, preferably by hinges, on one of the two respective posts. A door jamb for the door is preferably present on the other of the two posts and in this case, it is recommended that the door can be closed via at least one housing lock. It is within the scope of the invention that the portable sanitary-fixture housing according to the invention is configured to be rectangular or square in top view, and specifically preferably with rounded corners. In the case of the preferred embodiment having rounded corners, the corner posts advantageously provided on the corners have rounded outside faces. It is furthermore within the scope of the invention that the side walls of the portable sanitary-fixture housing according to the invention are plastic parts and preferably one-piece plastic parts. The door is also advantageously of plastic.

According to the invention, at least one support post and preferably one corner support post is hollow. According to one embodiment of the invention, at least two, highly preferably all or all four support posts/corner posts can be hollow. According to the invention, at least one electrically operated functional device or at least one part of an electrically operated functional device is inside the hollow post.

It has been proven advantageous for the empty post interior to extend as a passage in the longitudinal direction of the support or corner post. A post that is hollow is preferably hollow over at least 50%, preferably over at least 60% and highly preferably over at least 70% of its length. The interior according to one embodiment of the invention is thereby delimited or enclosed on all sides by the walls of the post. According to another embodiment of the invention, at least one opening in the wall of the post is provided on the inside wall of a support or corner post to connect the interior of the post to the interior of the portable sanitary-fixture housing. It is also within the scope of the invention that a plurality of openings or perforations is provided in this case in the wall between the interior and the interior space of the portable sanitary-fixture housing. It is also possible for the at least one interior of the post to open externally into the outside environment of the portable sanitary-fixture housing via at least one opening. In this case, a plurality of openings or perforations can also be provided in principle.

With respect to a horizontal cross section through a post provided with at least one interior, preferably at least 30%, preferably at least 40%, highly preferably at least 50% and especially preferably at least 60% of the cross sectional area consists of the interior and the rest of the cross sectional area consists of the wall of the post. According to a preferred embodiment, the hollow portion of the cross sectional area is at least 70%, preferably at least 75%. It is within the scope of the invention that the cross sectional areas specified above with respect to the interior percentage extend over at least 40%, preferably at least 50% and highly preferably at least 60% of the vertical length of the interior of the post. The terms horizontal and vertical relate in terms of this application moreover to the vertical set-up state of the portable sanitary-fixture housing according to the invention, in which the roof part is on top and the floor part is on the bottom.

According to the invention, at least one electrically operated functional device and/or at least one part of an electrically operated functional device is provided inside a hollow support post/corner post. In principle, a plurality of cavities can also be formed in a post and then at least one electrically operated functional device and/or at least one part of an electrically operated functional device can be contained in at least one of cavities or also in all of the cavities. It is within the scope of the invention that more than one post is hollow or has at least one interior and that at least one electrically operated functional device and/or at least one part of an electrically operated functional device is provided in a respective portion of the posts or in the cavities of the posts.

A recommended embodiment of the invention is characterized in that the electrically operated functional device is an exhaust fan for discharging exhaust air from the housing. In this connection, it is within the scope of the invention that at least one ventilation device or at least one ventilator of the exhaust fan is inside the hollow post as a part of the electrically operated functional device. Furthermore, it is within the scope of the invention that at least one exhaust air line for discharging exhaust air from the housing is accommodated inside a hollow support or corner post as a part of an electrically operated functional device. If at least one part of the electrically operated functional device is present inside a hollow post, it is within the scope of the invention that at least one opening, preferably a plurality of openings or perforations is provided in the wall of the post facing the interior space of the portable sanitary-fixture housing. In this way, it is possible for exhaust air to be pulled from the interior space of the housing. In this case, it is recommended that the exhaust air in the upper region of these post be released to the outside. In this respect, it is within the scope of the invention that the at least one interior of the post extends into the upper region of the post or that at least one exhaust air line extends into the upper region of the post and that at least one exterior opening is present in the wall of the post that is opens outward or to the outside environment.

According to an especially preferred embodiment of the invention, the at least one interior of the at least one post opens into the interior of the housing via at least one opening and at least one ventilation device or at least one fan is preferably provided in the at least one interior and it is recommended that at least one exhaust air conduit is present in the at least one interior of the post, which exhaust air conduit is preferably attached to the at least one ventilation device and preferably extends into the upper region of the post. At least one opening in the wall of the post facing outward is advantageously provided in the upper region of the post and connects the external environment of the housing to the interior of the post or to the exhaust air conduit present in the post and in this respect is also in connection with the interior of the housing.

A preferred embodiment of the invention is characterized in that the electrically operated functional device is at least one light fixture that is preferably provided for illuminating the interior of the housing. In this embodiment, at least one light fixture is advantageously contained in the hollow support or corner post of the housing. According to one embodiment, the light fixture can have at least one LED.

With respect to the above-described embodiment, it is within the scope of the invention that at least one inner wall of a post accommodating the at least one light fixture is configured at least in sections to be light permeable so that the interior of the portable sanitary-fixture housing can be illuminated using the at least one light fixture. The entire wall or substantially the entire wall of the post is preferably configured to be light permeable or at least the parts of interior wall of the post facing the interior of the portable sanitary-fixture housing are configured to be light permeable or configured to be substantially light permeable. The at least one region of these wall configured to be light permeable or the wall is preferably configured to be transparent and/or opaque. It is within the scope of the invention that the wall of the post that is light permeable at least in sections is configured such that an adequate illumination of the interior of the housing is possible, and specifically preferably when the door of the housing is closed. According to one embodiment of the invention, at least one light fixture each can be accommodated in the cavities of a plurality of posts of the housing, and then the inner wall of the post or the wall of the post facing the interior is preferably light permeable or is configured at least in sections to be light permeable so that the interior of the housing can then be illuminated using the light fixture of a plurality of posts. One embodiment is characterized in that the rear posts opposite the door each have at least one interior holding a respective light fixture, and the inner wall of the posts is light permeable or partly light permeable. In the case of four posts of the housing, then the two rear posts of the housing are then each equipped with at least one internal light fixture. It is incidentally with the scope of the invention that the power supply lines for the electrical supply of the light fixture are also contained inside the post accommodating the at least one light fixture. The power supply lines can extend in this case in the longitudinal or vertical longitudinal direction of the respective post.

It is within the scope of the invention that at least one power source is accommodated in the portable sanitary-fixture housing for operation of the electrically operated functional device and is preferably contained inside a hollow post. The power source is advantageously contained in the same post in which the electrically operated functional device or at least one part of the electrically operated functional device is also accommodated. It is within the scope of the invention that the power source is a rechargeable battery (accumulator) or a non-rechargeable battery. An especially recommended embodiment of the invention is characterized in that the power source or the battery is in the lower region of the post near the floor part. According to one embodiment, the at least one power source or battery is accommodated in the lower half with respect to the vertical length L of a post.

An especially preferred embodiment of particular importance within the scope of the invention is characterized in that the at least one electrical functional device is solar powered. To this end, at least one solar cell or at least one solar cell unit for the solar operation of the least one electrically operated functional device is on the outer face of the housing. According to an especially recommended embodiment, the at least one solar cell or the at least one solar cell unit is on the roof of the housing. In this case, it is recommended that the at least one solar cell or the at least one solar cell unit is integrated into the roof of the housing so that there are preferably no, or a small number of, projecting structural elements. Thus, one embodiment of the invention is characterized in that the surface of at least one solar cell or of the at least one solar cell unit is flush or substantially flush with the upper face of the roof of the housing. Connecting lines or electrical supply lines are advantageously guided through the respective post between the at least one solar cell or between the at least one solar cell and the electrical functional device in a post or guided through an interior of the respective post. It is within the scope of the invention that, in the case of a solar-powered electrical functional device, at least one buffer battery or solar battery is provided in the portable sanitary-fixture housing according to the invention and is preferably accommodated in a support post/corner post of the portable sanitary-fixture housing. The buffer battery or solar battery is advantageously located in the post in which the electrically operated functional device or at least one part of the electrically operated functional device is located. It is furthermore within the scope of the invention that the buffer battery or solar battery is connected by lines or electrical supply lines to the solar cell or to the solar cell unit and to the electrically operated functional device. According to an especially preferred embodiment of the invention, the buffer battery or the solar battery is in the lower region of a post, and specifically recommended in the lower third or in the lower quarter of the post with respect to the vertical length L of the post. As a result, the stability of the portable sanitary-fixture housing is increased in an advantageous manner.

In principle, other electrical functional devices can also be used in the scope of the invention. Thus, a hifi system or at least one part of a Hifi system can be contained in at least one interior of at least one post of the housing. For example, at least one loudspeaker or at least one loudspeaker box can be integrated into a inner wall of a post of the housing.

The fact that at least one part of at least one electrically operated functional device or at least one electrical functional device is inside a hollow support post means, according to one embodiment of the invention, that the part or the functional device does not fill the interior of the post completely and that a free space also still remains in the interior along with the part or along with the functional device. According to another embodiment, the part or the functional device fills the interior of the post completely or substantially completely.

According to one embodiment of the invention, the electrically operated functional device is an electrically operated heater. The heater is thereby preferably inside the portable sanitary-fixture housing and it is recommended that, in at least one support post, at least one part of the electrically operated functional device or heater is provided, in particular at least one electrical supply line and/or at least one transformer and/or at least one battery. According to one embodiment, at least one electrical connection, for example an electrical outlet, is provided inside the portable sanitary-fixture housing, preferably on the outside of at least one support post of the portable sanitary-fixture housing. Then at least one part of an electrical functional device attached to the outlet, for example an electrical supply line and/or a transformer and/or a battery, is preferably accommodated in the relevant support post. An outlet facing the interior of the portable sanitary-fixture housing can advantageously be used for the connection of an electrically operated heater. Other electrical functional devices, for example a lamp, a LED light or the like can also be plugged into such an outlet. For this reason, simple retrofitting of the portable sanitary-fixture housing according to the invention is possible with electrical functional devices, such as for example a heater, a lamp or the like.

A special embodiment of the invention is characterized in that an electrically operated heating foil is used as the electrically operated functional device and is preferably mounted on an interior wall of the portable sanitary-fixture housing, in particular on an inner wall of at least one support post facing the interior of the portable sanitary-fixture housing. The heating foil is advantageously a foil, for example a plastic foil, with imprinted heating wires. It is within the scope of the invention that, at least one support post of the portable sanitary-fixture housing according to the invention holds at least one part of the electrical functional device, and specifically in particular at least one electrical supply line and/or at least one transformer and/or at least one battery.

One embodiment of the invention is characterized in that the electrically operated functional device is an electrically operated fragrance dispenser. In principle, a mechanically operated fragrance dispenser could also be used in the portable sanitary-fixture housing according to the invention.

A proven embodiment of the invention is characterized in that the portable sanitary-fixture housing according to the invention has four sides or four side walls as well as preferably four corner posts. In this case, one side wall is preferably formed by a door that is advantageously pivotally mounted to a corner post via hinges. It is within the scope of the invention that at least one sanitary device be inside the portable sanitary-fixture housing according to the invention, and the sanitary device is preferably a toilet and/or a urinal.

Reference was already made at the outset that the portable sanitary-fixture housing according to the invention is a mobile or a transportable sanitary unit according to a preferred embodiment. As a result, the portable sanitary-fixture housing according to the invention is advantageously constructed to be relatively compact and in this respect it is within the scope of the invention that the volume of the interior of the portable sanitary-fixture housing is merely 1 to 4 $m^3$, preferably 1.25 to 3.5 $m^3$ and especially preferably 1.25 to 3 $m^3$.

The invention is based on the discovery that a portable sanitary-fixture housing according to the invention, in particular a portable-toilet housing, can be equipped in an easy and effective manner with an electrically operated functional device. The invention is based furthermore on the discovery that, to accommodate such an electrically operated functional device, a support or corner post of the portable sanitary-fixture housing is suitable in particular, because the post can be equipped in a manner that is simple and not very time consuming with a corresponding empty interior so that the electrically operated functional device can be accommodated thereby in a problem-free and functionally reliable manner. The special advantage in this case is that the functional device can be integrated into the post as it were and therefore no or virtually no interfering or protruding structural parts are present. This considerably facilitates the maintenance, repair and cleaning of the interior of a portable sanitary-fixture housing according to the invention. Incidentally, the electrically operated functional device can be used effectively in a post of the portable sanitary-fixture housing according to the invention, in that it is a light fixture according to the preferred embodiment or even as an exhaust fan according to another preferred embodiment. The portable sanitary-fixture housing according to the invention is characterized by simple manufacture, simple and problem-free transport as well as by less complicated repair, maintenance and/or cleaning. The measures according to the invention are associated with low costs and minimal effort.

The invention will be explained in greater detail in the following based on merely one drawing showing one embodiment. The drawing is a schematic representation of the following:

FIG. 4 is a top view of a portable sanitary-fixture housing according to the invention, partially broken away.

Figure 1:
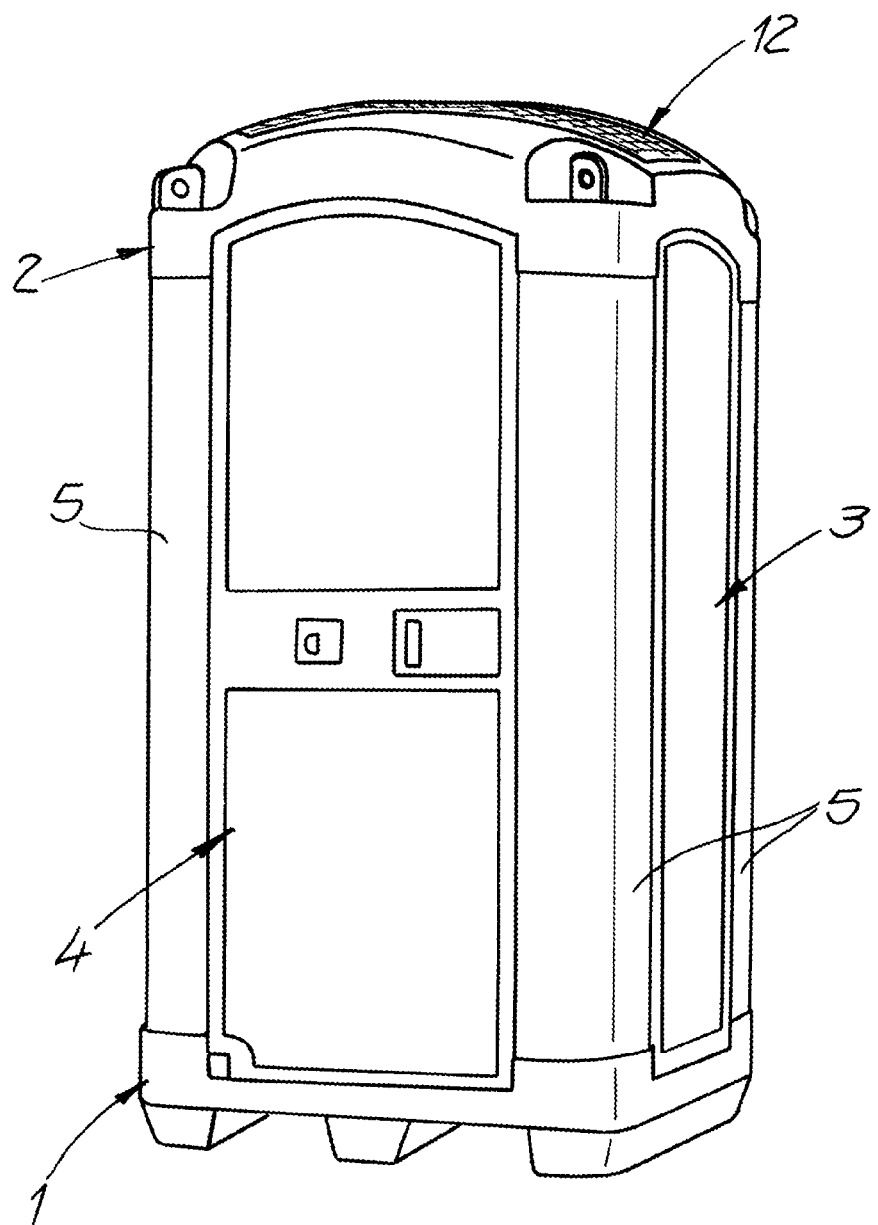
FIG. 1 is a perspective view of a portable sanitary-fixture housing according to the invention or portable-toilet housing.
Figure 2:
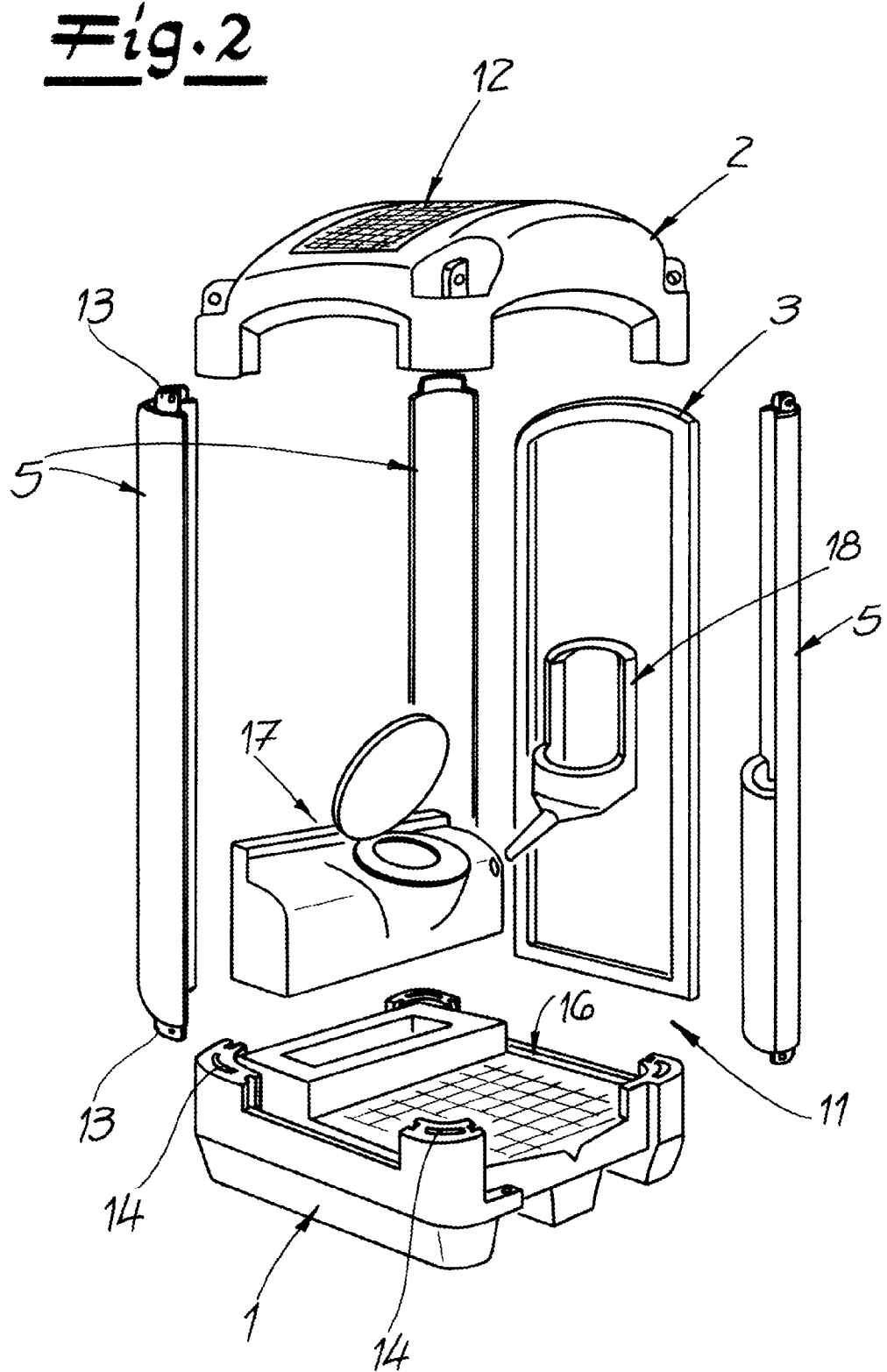
FIG. 2 is an exploded view of the structure shown in FIG. 1.
Figure 3:
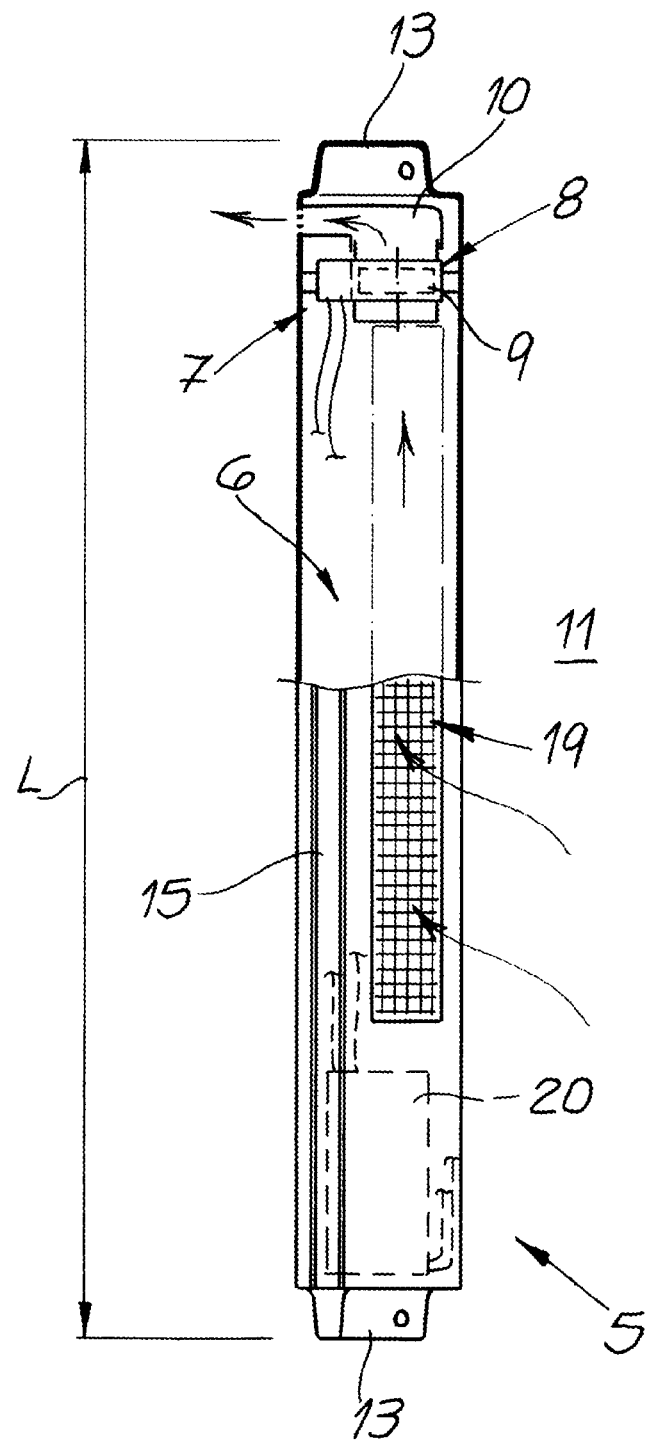
FIG. 3 is a partly longitudinal section through a support or corner post of the portable sanitary-fixture housing according to the invention.

The figures show a portable sanitary-fixture housing according to the invention that is configured preferably here as a portable-toilet housing. The portable sanitary-fixture housing or portable-toilet housing preferably here has a floor part 1, a roof part 2, three side walls 3, a door 4, and four support/corner posts 5. Here, the floor part 1 is connected to the roof part 2 via the four corner posts 5 and also the floor part 1 and roof part 2 are connected to each other by the three side walls 3 and by the door 4.

Advantageously and here, the corner posts 5 are equipped at their upper and lower ends with tongues 13 for a tongue-and-groove connection to the floor part 1 and to the roof part 2. Preferably here, both the floor part 1 as well as the roof part 2 has a groove 14 for receiving the respective tongue 13 of the corner post 5. Furthermore, it is recommended and here that the corner posts 5 be equipped on the edges facing side edges of the side walls 3 with grooves 15 for a tongue-and-groove connection to the side walls 3. In this way, three side walls 3 are connected to the corner posts 5 via tongue-and-groove connections. Moreover, the floor part 1 and the roof part 2 are also each provided on each of edges associated with upper and lower edges of the side walls 3 with a respective groove 16 in which the side wall 3 can engage. Therefore, a side wall 3 engages with the lower edge thereof via a tongue-and-groove connection in the associated groove 16 of the floor part 1 and with the upper edge thereof in an associated groove 16 of the roof part 2. As described, the side walls 3 engage with the side edges thereof in the grooves 15 of the corner posts 5. Also, it is within the scope of the invention that the corner posts 5 are one-piece plastic parts extending vertically and longitudinally.

Moreover, the front face of the portable sanitary-fixture housing according to the invention carries the door 4 that is pivotally attached to a corner post 5 via hinges (not shown). Preferably here, both a toilet bowl 17 and a urinal 18 are provided in the portable sanitary-fixture housing.

According to the invention, the hollow support or corner post 5 has an empty interior 6 in which at least one electrically operated functional device 7 is contained.

Preferably here, the interior 6 extends over at least one portion of the vertical length L of the associated corner post 5. According to one embodiment and here, the electrically operated functional device 7 is an exhaust fan 8 for discharging exhaust air from the housing according to the invention. Advantageously and here, a ventilation device 9 of the exhaust fan 8 is in the interior 6 of the hollow corner post 5 of the housing as a part of the electrically operated functional device 7. Furthermore, the corner post 5 preferably here has openings 19 that connect the interior 6 to the interior 11 of the portable sanitary-fixture housing so that exhaust air can be pulled out of the interior 11 of the housing by the ventilation device 9. An exhaust air conduit 10 preferably attached to the ventilation device 9 can release the exhaust air in the upper region of the corner post 5 to the exterior of the portable sanitary-fixture housing. Here, the interior of the corner post 5 is configured such that, along with accommodating the ventilation device 9, free space is left in the interior 6.

According to an especially preferred embodiment and here, the electrical functional device 7 or the exhaust fan 8 provided here is configured to be solar powered. To this end, here, there is at least one solar cell unit 12 for the solar power of the exhaust fan 8. In this case, the solar cell unit 12 is preferably here on the outer face of the housing, and specifically it is recommended and here that the solar cell unit 12 is on the roof of the housing or on the roof part 2 of the housing. Advantageously here, the solar cell unit 12 is integrated into the upper face of the roof part 2 so that the upper side of the solar cell unit 12 is flush or substantially flush with the upper face of the roof part 2. It is here recommended that a buffer battery 20 is furthermore provided for powering the exhaust fan 8. Preferably here, the buffer battery 20 is in the same corner post 5 in which the exhaust fan 8 or the ventilation device 9 is also held. Preferably here, the buffer battery 20 in this case is positioned with respect to the vertical length L of the corner post 5 in the lower quarter of the length L.

It is within the scope of the invention that electrically operated functional devices or parts of electrically operated functional devices are several of the support or corner posts 5 of the portable sanitary-fixture housing according to the invention. Thus, an exhaust fan 8 or a ventilation device 9 of an exhaust fan 8 could be accommodated for example in a corner post 5, and an electrically operated functional device in the form of a light fixture could be accommodated in another corner post 5 for example.

The invention claimed is:

1. A housing for a portable sanitary fixture and comprising:
    a generally square floor part,
    a generally square roof part above the floor part,
    four side walls extending vertically between the floor part and the roof part,
    four corner support posts at least substantially of plastic, flanking the side walls, extending vertically between corners of the roof part and floor part, and of which two are hollow and one of the hollow support posts is hollow over at least 70% of its length,
    an electrically operated functional device or at least one part of at least one electrically operated functional unit held in an interior of the one hollow support post, and
    a battery connected to the device or functional-unit part and in the one hollow support post below the device or functional-unit part.

2. The housing for a portable sanitary fixture according to claim 1, wherein the electrically operated functional device is an exhaust fan for discharging exhaust air from the housing and is contained inside the one hollow support corner post.

3. The housing for a portable sanitary fixture according to claim 2, further comprising:
    at least one exhaust air conduit for discharging exhaust air from the housing in one of the hollow support posts.

4. The housing for a portable sanitary fixture according to claim 1, wherein the electrically operated functional device is at least one light fixture preferably provided for illuminating an interior of the housing and the at least one light fixture is contained in the one hollow support post.

5. The housing for a portable sanitary fixture according to claim 4, wherein the at least one light fixture has at least one LED.

6. The housing for a portable sanitary fixture according to claim 4, wherein at least one wall delimiting the interior of the one hollow support post accommodating the at least one light fixture has sections that are light permeable so that an interior of the portable sanitary-fixture housing can be illuminated using the light fixture.

7. The housing for a portable sanitary fixture according to claim 1, wherein the electrically operated functional device is an electrically operated heater at least partially accommodated inside the one hollow support post.

8. The housing for a portable sanitary fixture according to claim 1, wherein the electrically operated functional device is an electrically operated fragrance dispenser.

9. The housing for a portable sanitary device according to claim 1, wherein the electrical functional device is solar powered.

10. The housing for a portable sanitary device according to claim 9, further comprising:
    at least one solar cell for the solar operation of the electrically operated functional device mounted on the roof part of the housing.

11. The housing for a portable sanitary device according to claim 1, wherein the floor part and/or the roof part and/or the side walls are made at least substantially of plastic.

12. A housing for a portable sanitary device, the housing comprising:
    a lower generally square floor part having corners;
    an upper generally square roof part having corners;
    respective support posts at least substantially of plastic and each extending vertically from a respective corner of the floor part to a respective corner of the roof part, two of the posts being hollow and one of the hollow support posts being hollow over at least 70% of its length;
    respective side walls extending between the posts, roof part, and floor part;
    an electrically powered device inside the one hollow support post, and
    a battery connected to the device or functional-unit part and in the one hollow support post below the device.

13. The housing according to claim 1, wherein the roof part, floor part, corner posts, and side walls are rigid, the corner posts each being of one piece.

* * * * *